United States Patent [19]
Lorenzo et al.

[11] Patent Number: 4,877,299
[45] Date of Patent: Oct. 31, 1989

[54] METAL-INSULATOR-SEMICONDUCTOR CONTROL OF GUIDED OPTICAL WAVES IN SEMICONDUCTOR WAVEGUIDES

[75] Inventors: Joseph P. Lorenzo, Stow; Richard A. Soref, Newton Centre, both of Mass.

[73] Assignee: United States of America as represented by the Secretary of the Air Force, Washington, D.C.

[21] Appl. No.: 323,736

[22] Filed: Mar. 15, 1989

[51] Int. Cl.$^4$ ............................................. G02B 6/10
[52] U.S. Cl. ............................. 350/96.14; 350/96.12; 357/17
[58] Field of Search ............... 350/96.12, 96.13, 96.14; 357/17, 23.2, 27 R, 41

[56] References Cited

U.S. PATENT DOCUMENTS

| | | | |
|---|---|---|---|
| 3,713,912 | 1/1973 | Schwartz | 357/23.2 X |
| 4,693,546 | 9/1987 | Lorenzo et al. | 350/96.14 X |
| 4,693,547 | 9/1987 | Soref et al. | 350/96.14 X |
| 4,728,167 | 3/1988 | Soref et al. | 350/96.14 X |
| 4,746,183 | 5/1988 | Soref et al. | 350/96.14 |
| 4,787,691 | 11/1988 | Lorenzo et al. | 350/96.14 |
| 4,799,095 | 1/1989 | Baliga | 357/38 |

Primary Examiner—William L. Sikes
Assistant Examiner—Akm E. Ullah
Attorney, Agent, or Firm—Robert L. Nathans; Donald J. Singer

[57] ABSTRACT

This invention describes an infrared lightwave modulation and switching apparatus for very rapidly changing the refractive index of a light-transmitting, doped, semiconductor waveguide. Electrical control is exerted by a MIS diode or MISFET. The apparatus includes a transparent crystalline silicon waveguide, an electrically insulating dielectric layer overlaying a portion of that waveguide, and an elongated, conductive gate electrode in contact with the insulator. A gate voltage applied between the semiconductor and gate serves to deplete free charge carriers from the region of the waveguide under the gate. Elongated source and drain electrodes may be added to enhance electro-optic control.

37 Claims, 3 Drawing Sheets

METAL-INSULATOR-SEMICONDUCTOR CONTROL OF GUIDED OPTICAL WAVES IN SEMICONDUCTOR WAVEGUIDES

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of optical waveguides and phase modulators for modulating light traveling through the waveguides.

Recently, considerable interest has been shown in the transmission of large amounts of information from many sources to many destinations by means of tiny beams of light transmitted through optical waveguides. Information is modulated upon the tiny beams of light and the beams are thereafter switched appropriately through a network of light guides or fiber optic elements to be routed to desired destinations. Devices for switching the tiny light beams by electronic control involve waveguides surrounded by material of lower refractive index to confine the light. 2×2 "X" waveguide switches of the two-mode interference type have a waveguide in the mid-region of the switch whose dimensions are large enough to propagate the two lowest-order modes. The waveguide formed at the intersection of the monomode legs of the "X" type switch utilizes means for controlling the electric field (or free-carrier density) within the guide to in turn cause changes in the index of refraction of various cross-sectional portions of the switch intersection, and as a result, the velocity of propagation of the even mode relative to the odd mode is differentially affected to switch the direction of the output light beam. Our U.S. Pat. No. 4,693,547 teaches utilizing an LED for switching control and our U.S. Pat. Nos. 4,746,183, 4,787,691, and 4,728,167, incorporated by reference herein, teach utilizing pn junctions to inject free carriers into the waveguide at the X-switch intersection. However, the generation of heat due to the high resulting $I^2R$ losses and the dissipation of electrical power is undesirable.

SUMMARY OF PREFERRED EMBODIMENTS OF THE INVENTION

It is thus an object of the present invention to provide apparatus for changing the refractive index of a light-transmitting semiconductor waveguide which may be utilized as a stand-alone light-transmitting waveguide phase modulator, or may be incorporated into numerous electro-optic devices, such as a Mach-Zehnder intensity modulator, a 2×2 directional coupler switch, a 2×2 two-mode switch such as the X-switches described above, multimode TIR (total internal reflection) switch disclosed in our U.S. Pat. No. 4,746,183,etc. In accordance with the most preferred embodiment of the invention, an insulating dielectric layer contacts a portion of a doped waveguide and a metallic gate electrode in turn contacts the dielectric member and is coupled to a voltage supply which causes the gate electrode to very rapidly deplete mobile charge carriers within the light-transmitting doped semiconductor waveguide. In contrast with devices to provide injection of carriers described in detail in our patents cited above, the present invention causes the carriers to be depleted or swept out of the waveguide faster than the carriers can be injected, and thus substantially higher switching speeds are obtainable. Additionally, the aforesaid heat generation problem and electrical power dissipation has been substantially eliminated because heavy current flow and $I^2R$ losses have been eliminated. The resulting change in density of the carriers and the changes in the localized index of refraction create an index profile favorable to very high speed switching and/or modulation of optical signals passing through the waveguide.

In accordance with a second embodiment of the invention, source and drain electrodes are added to further alter the index profile and enhance control. In accordance with a third embodiment of the invention, a light transmitting waveguide having first and second side portions underlying first and second dielectric layers in turn underlying first and second metallic gate electrodes is provided, together with a voltage supply for selectively applying voltages to the first or second gate electrodes for in turn selectively phase retarding one of two asymmetric modes within the waveguide. The result is the switching of the output beam from the waveguide as mentioned above.

BRIEF DESCRIPTION OF THE DRAWINGS

Other objects features and advantages of the present invention will become apparent upon study of the following detailed description taken in conjunction with the drawings in which.

A DETAILED DESCRIPTION OF PREFERRED EMBODIMENTS OF THE INVENTION

Figure 1A:
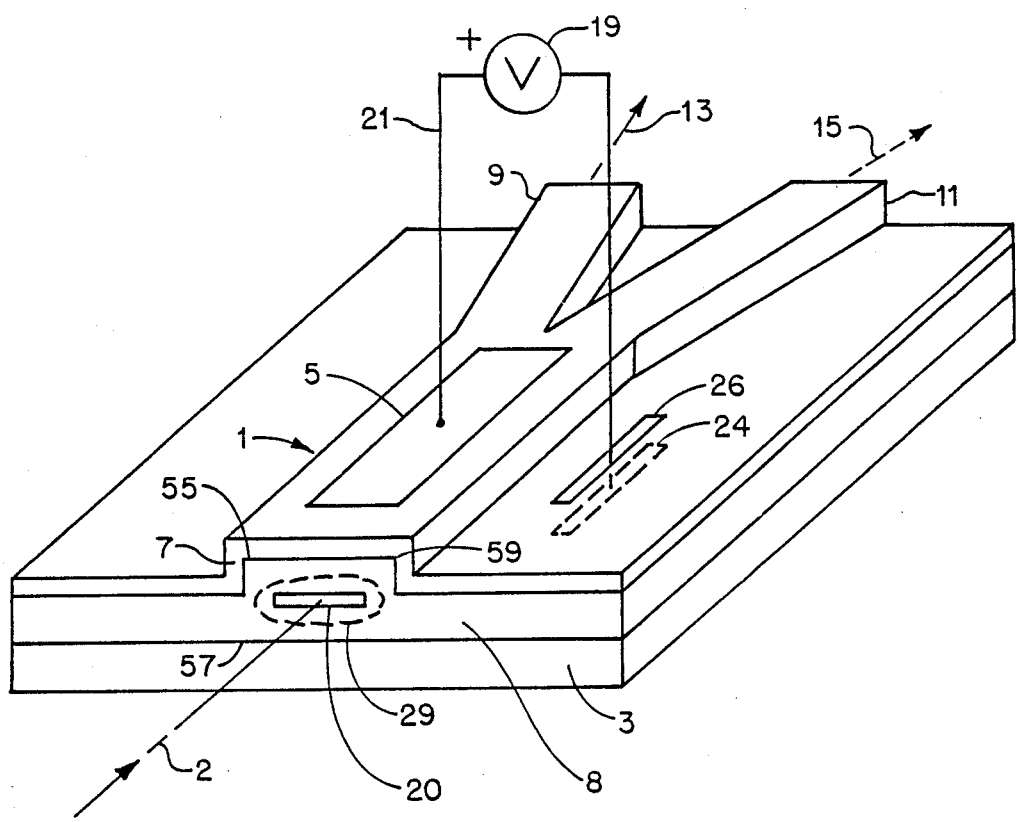
FIG. 1a illustrates a light-transmitting doped semiconductor waveguide which may be positioned at the central rib of the aforesaid 2×2 "X" switch. Here, a cross-section through one-half of the switch is shown (in effect, a 1×2 switch).
Figure 1B:
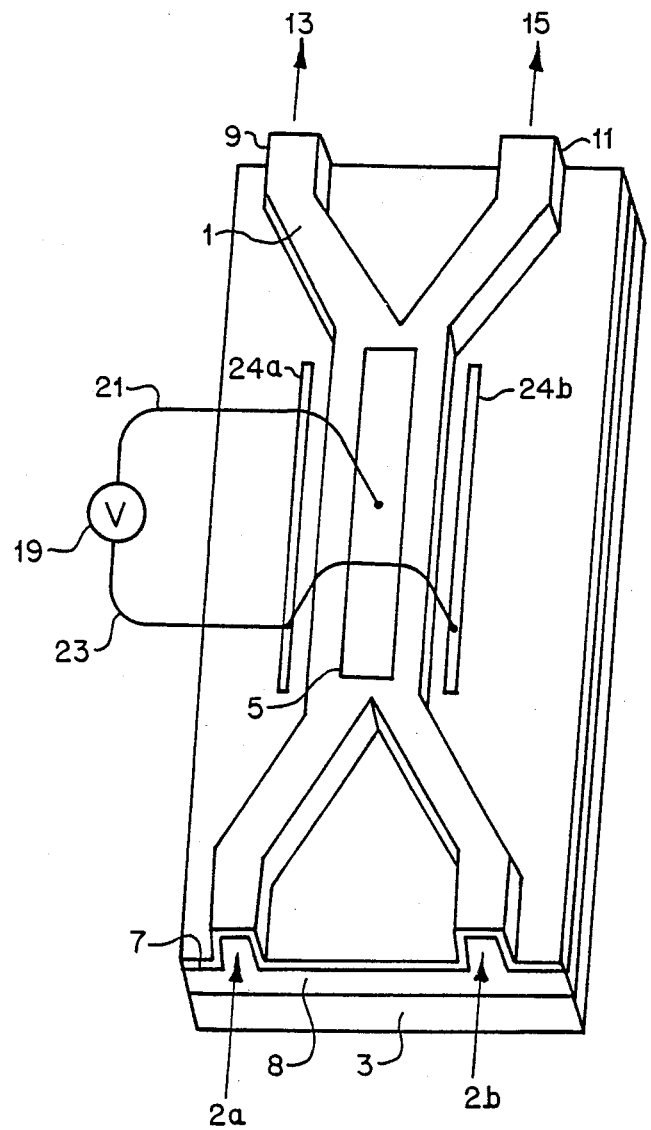
FIG. 1b shows a complete perspective view of the 2×2 electro-optic switch.

As shown in FIGS. 1a and 1b, the light transmitting doped semiconductor waveguide 1, which could for example form part of the aforesaid "X" type switch, extends along longitudinal axis 2 and is formed upon substrate 3 which is an optical isolation layer typically of $SiO_2$. Waveguide 1 has an electrically insulating dielectric layer 7, having a thickness of about 1000 Å positioned upon waveguide layer 8, as shown, which in turn has a metallic gate electrode 5 formed upon the upper surface of dielectric 7. Layer 3 has an index of refraction (n) of about 1.47 much lower than the index of the waveguiding material B. Likewise, dielectric layer 7 has a similar index of refraction so that light is contained within waveguide 1 as it propagates along longitudinal axis 2. Reference may be made to our U.S. Pat. No. 4,789,642 which discusses the nature and function of the isolation layers 3 and 7.

Output legs 9 and 11 (monomode channel waveguides) are affixed to the waveguide as shown and light propagated along axis 2 may be selectively switched to one or the other of the legs. Arrows 13 and 15 represent the light as it exits the output ports of the switching device. The functioning of these switches is explained in greater detail in the above mentioned patents issued to the inventors of the present invention set forth above, and particularly in U.S. Pat. Nos. 4,787,691 (cols. 5–7) and 4,746,183 (cols. 5,6), and thus need not be repeated in detail herein. A voltage supply source 19 is coupled to metallic electrode 5 via conductor 21 and is coupled to the body or base portion S of semiconductor waveguide 1 via conductor 23 and electrode 24 positioned within an elongated orifice 26 formed within the upper dielectric layer 7. This applies control voltage to the MIS diode consisting of components 5,7, and 8.

The presently preferred compounds for dielectric member 7 are $SiO_2$, $Si_3N_4$, $Al_2O_3$ and $CaF_2$. The waveguide core 8 may be formed of Si, Ge, InP, GaAs, AlAs, InAs, and alloys thereof, although Si is presently preferred.

In the absence of the optional more heavily doped buried layer 20, semiconductor Si waveguide 1 is uniformly doped and has about 1 to $5 \times 10^{17}$ impurity atoms per $cm^3$. Our calculations indicate that with a rib waveguide core switching section 2500 Angstroms in height, full depletion of mobile carriers will be readily produced by the application of a reversed bias voltage of about 5 to 10 volts to metallic gate electrode 5 by the voltage supply source 19. A voltage of proper polarity on gate 5 swings the MIS diode (5,7,8) from accumulation to depletion, and eventually to inversion. This removes $1-5 \times 10^{17}$ carriers/$cm^3$ from the p-type center of waveguide 8. The rib height from 55 to 57 in FIG. 1a can vary somewhat from 2500 angstroms, and could be between 1500–3000 angstroms. For single mode operation, the width of the top of the rib at 55 to 59 can vary between 4000–8000 angstroms. The resultant phase shift at a wavelength of 1.3 micro-meters should be 180 degrees over a waveguide length of about 4000 micrometers. For a wavelength of 1.55 micro-meters, the phase shift should be 256 degrees.

The intensity profile of the light propagated along axis 2 is indicated at 29 in FIG. 1a. When a small reversed biased voltage (about +1 volts) is applied to metallic electrode 5, the depletion zone will be relatively small so that it does not intersect substantial portions of light intensity profile 29. When the voltage is raised to about +5 to +10 volts, the depletion cross-sectional area is substantially increased to roughly coincide with the intensity profile 29, in order to maximize the desired effect upon the effective index of refraction of the light within waveguide 1. With a voltage of +5 volts, the depletion layer widens by about 2000 angstroms.

Optionally, a buried layer 20 having a thickness of about within waveguide rib material 8. The buried layer is doped by cubic cm, and the surrounding portions of waveguide 8 are more lightly doped and would have about $1-5 \times 10^{15}$ impurity atoms per cubic centimeter. The overall height of 8 is now 4000–100,000 angstroms and that entire block of material can be depleted by the MIS voltage. Buried layer 20 is preferably centrally positioned with respect to the light intensity profile so that it is positioned coincident with the highest intensity peak of the light being propagated. This maximizes the "leverage" effect of the depletion of carriers with respect to the desired substantial change of the index of refraction of the light. An alternate configuration could employ an additional buried dielectric layer as disclosed in our U.S. Pat. No. 4,787,691 incorporated by reference herein. FIG. 1b is a perspective view of a $2\times2$ switch with two light inputs at 2a and 2b. Two elongated electrodes 24a, 24b are connected together as shown.

Figure 2:
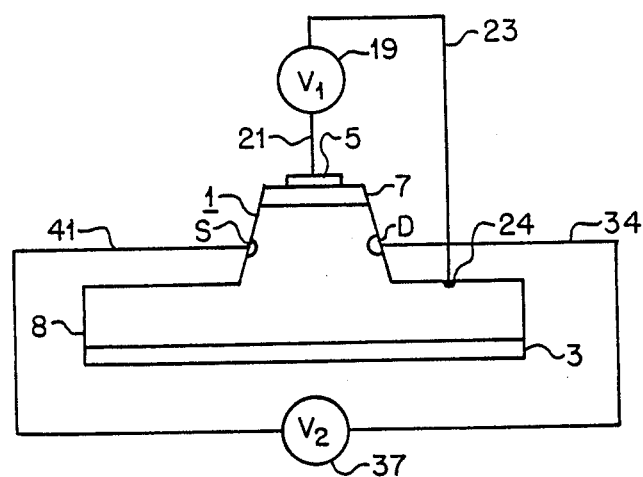
FIG. 2 illustrates an end view of the waveguide of FIG. 1a wherein source and drain electrodes are implanted in the sides of the waveguide.

FIG. 2 is similar to FIG. 1a except that a source electrode S and a drain electrode D have been formed within first and second side portions of the rib of the waveguide, and a forward biasing second D.C. voltage supply 37 of about 0.5 volts is connected to the source via conductor 41 and to the drain 35 via conductor 39. Alternatively, the source and drain electrodes could be formed upon waveguide plateaus adjacent to the rib. The source and drain electrodes extend parallel to the length of metallic gate electrode 5 and parallel with longitudinal axis 2, like electrode 24 in FIG. 1a. These source and drain electrodes can also be utilized to further alter the index profile and enhance control; together with the gate they form an elongated MISFET.

Voltage supply 19 is coupled to the upper wing of semiconductor waveguide 1 via electrode 24 similar to elongated electrode 24 shown in FIG. 1. Our calculations indicate that the distance between source S and drain D should be 5000–10,000 angstroms. As in FIG. 1, the rib height would be 2500

In summary, the reverse biased voltage of about between +5 and +20 volts applied by source 19, causes a faster, lower-current means of manipulating charge under the gate in the central portions of waveguide material 8 than the carrier injection utilized in our U.S. Pat. Nos. 4,787,691 and 4,746,183. Such a depletion region in the MISFET preferably substantially axis 2 under the control of the voltage applied by source 19. This rapid action is also advantageously utilized with minimum current flow owing to the upper dielectric layer 7. Dissipated power is accordingly substantially reduced along with heat generation or thermal "runaway". As mentioned earlier, this invention is not to be restricted to a $2\times2$ X-type or $1\times2$ Y-type switch and may be utilized as a phase modulator for altering the phase of light passing through the waveguide for the applications mentioned under the background of the invention.

Figure 3:
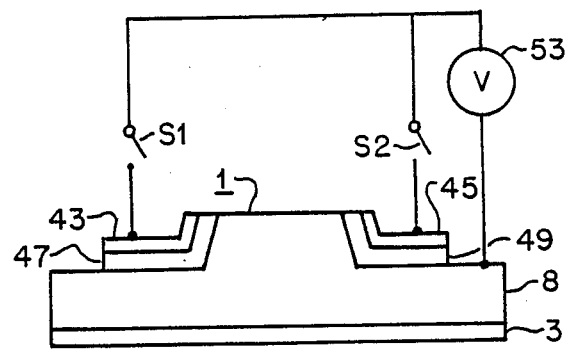
FIG. 3 illustrates the selective application of voltages to a pair of metallic electrodes positioned upon dielectric layers formed upon side portions of the waveguide for selectively phase retarding the anti-symmetric mode in the 2-mode waveguide to switch light propagated through the waveguide.

FIG. 3 illustrates a two mode waveguide 1 having twin metallic electrodes 43 and 45 coupled to voltage source 53 via switches S1 and S2 respectively. Metallic electrodes 43 and 45 contact dielectric layers 47 and 49, in turn formed upon side portions of the rib waveguide 1 as shown. In both FIGS. 2 and 3, layers 7 and 8 may have the same compositions and dimensions of 7 and 8 in FIG. 1. Voltage source 53 thus may be utilized to selectively apply appropriate voltages to the first or second gate electrodes 43 and 45 for inducing localized depletion of mobile charge carriers and for selectively phase retarding one of the two modes, the anti-symmetric mode, to produce switching of the output light from the waveguide as previously discussed in connection with the aforesaid patents to Soref and Lorenzo. This arrangement has the following advantages: Only the odd mode is affected, and the voltage sensitivity is twice as large as in the prior art.

While particular embodiments of the present invention have been shown and described, it is apparent that various changes and modifications may be made, and it is therefore intended that the following claims cover all such modifications and changes as may fall within the true spirit and scope of the invention. For example, should waveguide 1 be made of n type silicon, the polarity of the voltage sources would be reversed to induce rapid depletion in the waveguide.

We claim:

1. Apparatus for changing the refractive index of a light transmitting semiconductor waveguide comprising:
   (a) a light transmitting doped semiconductor waveguide;
   (b) an electrically insulating dielectric member in contact with and overlaying at least a portion of said waveguide;
   (c) electrically conductive gate electrode means in contact with and overlaying at least a portion of said dielectric member; and
   (d) voltage supply means coupled to said gate electrode means and to said waveguide for inducing depletion of mobile charge carriers within said light transmitting semiconductor waveguide.

2. The apparatus of claim 1 wherein said voltage supply means is coupled between said gate electrode means and said semiconductor waveguide.

3. The apparatus of claim 1 wherein said electrically insulating dielectric member is selected from the group consisting of $SiO_2$, $Si_3N_4$, $Al_2O_3$ and $CaF_2$.

4. The apparatus of claim 2 wherein said electrically insulating dielectric member is selected from the group consisting of $SiO_2$, $Si_3N_4$, $Al_2O_3$ and $CaF_2$.

5. The apparatus of claim 1 wherein said light transmitting doped semiconductor waveguide is selected from the group consisting of crystalline Si, Ge, InP, GaAs, AlAs, InAs, and alloys thereof.

6. The apparatus of claim 2 wherein said light transmitting doped semiconductor waveguide is selected from the group consisting of crystalline Si, Ge, InP, GaAs, AlAs, InAs, and alloys thereof.

7. The apparatus of claim 3 wherein said light transmitting doped semiconductor waveguide is selected from the group consisting of crystalline Si, Ge, InP, GaAs, AlAs, InAs, and alloys thereof.

8. The apparatus of claim 4 wherein said light transmitting doped semiconductor waveguide is selected from the group consisting of crystalline Si, Ge, InP, GaAs, AlAs, InAs, and alloys thereof.

9. The apparatus of claim 1 wherein said light transmitting semiconductor waveguide is uniformly doped and has $1-5 \times 10^{17}$ impurity atoms per $cm^3$.

10. The apparatus of claim 3 wherein said light transmitting semiconductor waveguide is uniformly doped and has $1-5 \times 10^{17}$ impurity atoms per $cm^3$.

11. The apparatus of claim 5 wherein said light transmitting semiconductor waveguide is uniformly doped and has $1-5 \times 10^{17}$ impurity atoms per $cm^3$.

12. The apparatus of claim 7 wherein said light transmitting semiconductor waveguide is uniformly doped and has $1-5 \times 10^{17}$ impurity atoms per $cm^3$.

13. The apparatus of claim 8 wherein said semiconductor waveguide has a height of 1500-3000 angstroms, and a rib width of 4000-8000 angstroms.

14. The apparatus of claim 9 wherein said semiconductor waveguide has a height of 1500-3000 angstroms, and a rib width of 4000-8000 angstroms.

15. The apparatus of claim 10 wherein said semiconductor waveguide has a height of 1500-3000 angstroms, and a rib width of 4000-8000 angstroms.

16. The apparatus of claim 11 wherein said semiconductor waveguide has a height of 1500-3000 angstroms, and a rib width of 4000-8000 angstroms.

17. The apparatus of claim 12 wherein said semiconductor waveguide has a height of 1500-3000 angstroms and a rib width of 4000-8000 angstroms.

18. The apparatus of claim 1 wherein said light transmitting semiconductor waveguide has about $1-5 \times 10^{15}$ impurity atoms per $cm^3$ and includes a sub-micron centrally positioned buried layer having about $1-10 \times 10^{17}$ impurity atoms per $cm^3$.

19. The apparatus of claim 3 wherein said light transmitting semiconductor waveguide has about $1-5 \times 10^{15}$ impurity atoms per $cm^3$ and includes a sub-micron centrally positioned buried layer having about $1-10 \times 10^{17}$ impurity atoms per $cm^3$.

20. The apparatus of claim 5 wherein said light transmitting semiconductor waveguide has about $1-5 \times 10^{15}$ impurity atoms per $cm^3$ and includes a sub-micron centrally positioned buried layer having about $1-10 \times 10^{17}$ impurity atoms per $cm^3$.

21. The apparatus of claim 7 wherein said light transmitting semiconductor waveguide has about $1-5 \times 10^{15}$ impurity atoms per $cm^3$ and includes a sub-micron centrally positioned buried layer having about $1-10 \times 10^{17}$ impurity atoms per cubic $cm^3$.

22. The apparatus of claim 18 wherein said light transmitting semiconductor waveguide has a thickness of 4000-100,000 angstroms and said buried layer has a thickness of about 1500 angstroms.

23. The apparatus of claim 19 wherein said light transmitting semiconductor waveguide has a thickness of about 4000-100,000 angstroms and said buried layer has a thickness of about 1500 angstroms.

24. The apparatus of claim 20 wherein said light transmitting semiconductor waveguide has a thickness of about 4000-100,000 angstroms and said buried layer has a thickness of about 1500 angstroms.

25. The apparatus of claim 21 wherein said light transmitting semiconductor waveguide has a thickness of about 4000-100,000 angstroms and said buried layer has a thickness of about 1500 angstroms.

26. The apparatus of claim 1 wherein said gate electrode means is elongated and is positioned along a top portion of said waveguide and further including an elongated source electrode positioned upon a first side portion of said semiconductor waveguide and a elongated drain electrode positioned along a second side portion of said waveguide opposite said first side portion and further including a second voltage supply means for forward biasing said drain electrode with respect to said source electrode.

27. The apparatus of claim 26 wherein said gate electrode, said source electrode and said drain electrode are parallel to each other.

28. The apparatus of claim 27 wherein said source electrode and said drain electrode are separated from each other by a distance of 0.5-1 micron.

29. Apparatus for changing the refractive index of a light transmitting doped semiconductor waveguide comprising:
   (a) a multimode light transmitting doped semiconductor waveguide having first and second side portions contacting first and second electrically insulating dielectric layers in turn contacting first and second electrically conductive gate electrodes; and
   (b) voltage supply means for enabling selective application of voltages to said first and second gate electrodes for inducing depletion of mobile charge carriers within said light transmitting semiconductor waveguide near said gates and for selectively altering the phase of one mode with respect to another mode supported by said light transmitting waveguide.

30. The apparatus of claim 29 wherein said voltage supply means is coupled between said gate electrode means and said semiconductor waveguide.

31. The apparatus of claim 30 wherein said electrically insulating dielectric member is selected from the group consisting of $SiO_2$, $Si_3N_4$, $Al_2O_3$ and $CaF_2$.

32. The apparatus of claim 30 wherein said light transmitting semiconductor waveguide is selected from the group consisting of Si, Ge, InP, GaAs, AlAs, InAs, and alloys thereof.

33. The apparatus of claim 31 wherein said light transmitting semiconductor waveguide is selected from the group consisting of Si, Ge, InP, GaAs, AlAs, InAs, and alloys thereof.

34. The apparatus of claim 7 wherein said light transmitting semiconductor has $1-5\times10^{17}$ impurity atoms per $cm^3$.

35. The apparatus of claim 31 wherein said light transmitting semiconductor has $1-5\times10^{17}$ impurity atoms per $cm^3$.

36. The apparatus of claim 32 wherein said light transmitting semiconductor has $1-5\times10^{17}$ impurity atoms per $cm^3$.

37. The apparatus of claim 33 wherein said light transmitting semiconductor has $1-5\times10^{17}$ impurity atoms per $cm^3$.

* * * * *